US011829672B2

(12) United States Patent
Suzuki

(10) Patent No.: US 11,829,672 B2
(45) Date of Patent: Nov. 28, 2023

(54) INFORMATION PROCESSING METHOD AND INFORMATION PROCESSING DEVICE

(71) Applicant: TOSHIBA TEC KABUSHIKI KAISHA, Tokyo (JP)

(72) Inventor: Katsunori Suzuki, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/864,459

(22) Filed: Jul. 14, 2022

(65) Prior Publication Data

US 2023/0063963 A1 Mar. 2, 2023

(30) Foreign Application Priority Data

Sep. 1, 2021 (JP) ................................ 2021-142621

(51) Int. Cl.
*G06F 3/12* (2006.01)

(52) U.S. Cl.
CPC ............ *G06F 3/126* (2013.01); *G06F 3/1203* (2013.01); *G06F 3/1232* (2013.01); *G06F 3/1292* (2013.01)

(58) Field of Classification Search
CPC ...... G06F 3/126; G06F 3/1203; G06F 3/1232; G06F 3/1292; G06F 3/1204; G06F 3/1226
See application file for complete search history.

(56) References Cited

U.S. PATENT DOCUMENTS

| 9,264,564 | B1* | 2/2016 | Suzuki | H04N 1/00204 |
| 2011/0267642 | A1* | 11/2011 | Salgado | G06F 3/1204 |
| | | | | 358/1.15 |
| 2014/0036287 | A1* | 2/2014 | Byer | G06F 3/1253 |
| | | | | 358/1.13 |
| 2022/0375268 | A1* | 11/2022 | Sonoda | G06V 40/28 |

FOREIGN PATENT DOCUMENTS

JP 2015-135570 7/2015

* cited by examiner

*Primary Examiner* — Iriana Cruz
(74) *Attorney, Agent, or Firm* — AMIN, TUROCY & WATSON, LLP

(57) ABSTRACT

Provided are an information processing program that can efficiently search for an information processing device having a camera function and an information processing device. According to one embodiment, an information processing program causes a computer of an information communication device that communicates with one or more information processing devices to execute information processes, and the information processes include: acquiring device information output from the information processing device; generating a first device list based on first information on the information processing device and second information on an imaging device corresponding to the information processing device, included in the device information; and outputting the first device list to a display unit of the information communication device.

20 Claims, 12 Drawing Sheets

FIG. 5

| 3311 | | | | | |
|---|---|---|---|---|---|
| INFORMATION ON MFP | | | | INFORMATION ON CAMERA | |
| DEVICE NAME | IP ADDRESS | INSTALLATION LOCATION | PRINTING-RELATED INFORMATION | IDENTIFICATION INFORMATION | IMAGING-RELATED INFORMATION |
| | | | | | |
| | | | | | |
| | | | | | |
| | | | | | |
| ⋮ | ⋮ | ⋮ | ⋮ | ⋮ | ⋮ |

INFORMATION PROCESSING METHOD AND INFORMATION PROCESSING DEVICE

CROSS-REFERENCE TO RELATED APPLICATION

This application is based upon and claims the benefit of priority from Japanese Patent Application No. 2021-142621, filed on Sep. 1, 2021, the entire contents of which are incorporated herein by reference.

FIELD

Embodiments described herein relate generally to an information processing method and an information processing device.

BACKGROUND

When printing, scanning, or the like are executed on information processing devices such as a multi-functional peripheral (MFP) by an information communication device such as a smartphone or a tablet terminal, a search service is proposed that enables the information communication device to search for an information processing device that is applicable to the execution. A device list displayed as a search result includes, for example, device information such as a name, an internet protocol (IP) address, and an installation location of the information processing device. In the related art, when an information processing device having a camera function is searched using the search service, only the device information is displayed in the device list without including information on the camera function. In this situation, when there are a plurality of applicable information processing devices, an information processing device having a camera function that is suitable for a desired condition of a user is not easy to be found. Therefore, there is a demand for a mechanism capable of efficiently searching for the information processing device having a camera function.

DESCRIPTION OF THE DRAWINGS

FIG. 5 is a schematic diagram illustrating an example of a management data record stored in a management file;

DETAILED DESCRIPTION

In general, according to one embodiment, an information processing method that can efficiently search for an information processing device having a camera function and an information processing device are provided.

An information processing method according to an embodiment is executed by a computer of an information communication device that communicates with one or more information processing devices, and the method includes: acquiring device information output from the information processing device; generating a first device list based on first information on the information processing devices and second information on imaging devices corresponding to the information processing devices included in the device information; and outputting the first device list to a display unit of the information communication device.

Hereinafter, an embodiment will be described with reference to drawings. In the present embodiment, an MFP is exemplified as one aspect of an information processing device, and a mobile terminal such as a smartphone owned by a user is exemplified as one aspect of an information communication device.

First Embodiment

Figure 1:
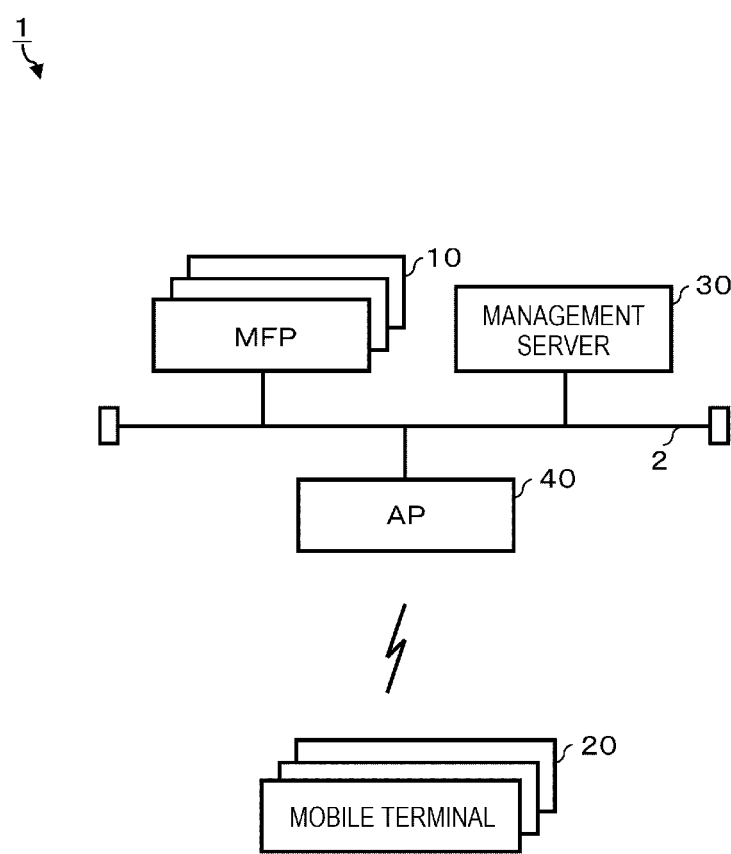
FIG. 1 is a schematic diagram illustrating a schematic configuration of an information processing system according to an embodiment.

FIG. 1 is a schematic diagram illustrating a schematic configuration of an information processing system 1 according to a first embodiment.

The information processing system 1 includes one or more MFPs 10, one or more mobile terminals 20, and a management server 30. A communication network 2 is connected to the MFPs 10 and the management server 30 by wired or wireless connection. For example, the Internet is used as part of the communication network 2. Each of the mobile terminals 20 enables wireless communication with an access point 40. The access point 40 relays communication between devices, that is, the MFPs 10, the management server 30, and the mobile terminals 20 which are connected to the communication network 2. The management server 30 provides device information to each mobile terminal 20. The device information will be described in detail later. In the information processing system 1 according to the present embodiment, the management server 30 stores the device information output by the MFP 10, and the management server 30 outputs the device information to the mobile terminal 20 in response to an inquiry from the mobile terminal 20. The mobile terminal 20 generates and displays a first device list and a second device list based on the device information. The first device list and the second device list will be described in detail later. Thus, the information processing system 1 is a system in which a user can search for the MFP 10 using the mobile terminal 20.

Figure 2:
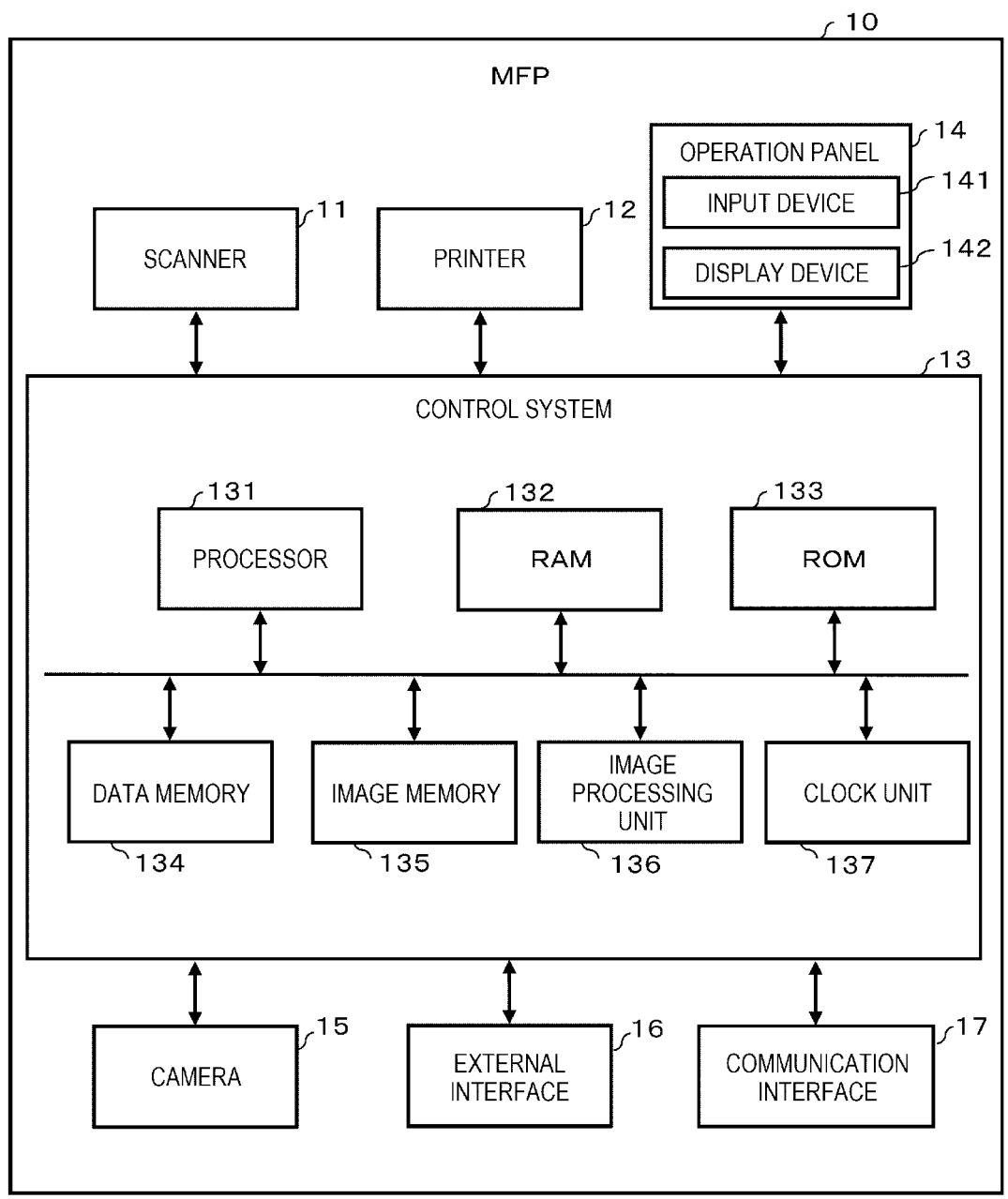
FIG. 2 is a schematic diagram illustrating a schematic configuration of an MFP.

FIG. 2 is a block diagram illustrating a schematic configuration of the MFP 10 according to the embodiment. As illustrated in FIG. 2, the MFP 10 includes a scanner 11, a printer 12, a control system 13, an operation panel 14, a camera 15, an external interface 16, and a communication interface 17. The scanner 11, the printer 12, the operation panel 14, the camera 15, the external interface 16, and the communication interface 17 are connected to the control system 13.

The scanner 11 is a device that optically reads an image of a document and converts the image into image data according to an operation instruction from the control system 13. The scanner 11 outputs the image data of the read document to the control system 13.

The printer 12 prints an image on a paper based on the image data supplied from the control system 13 under various printing conditions specified by the control system 13. As the printer 12, a printer having various image forming methods can be applied. For example, the printer 12 may be an electrophotographic printer, an inkjet printer, a thermal transfer printer, or the like.

The control system 13 integrally controls operations of the scanner 11, the printer 12, the operation panel 14, the camera 15, the external interface 16, the communication interface 17, and the like. The control system 13 includes a processor 131, a random-access memory (RAM) 132, a read-only memory (ROM) 133, a data memory 134, an image memory 135, an image processing unit 136, and a clock unit 137.

The processor 131 executes processes such as calculation and control according to programs. The processor 131 is, for example, a central processing unit (CPU). The processor 131 executes various processes based on programs stored in the ROM 133 or the data memory 134.

The RAM 132 is a working memory. The RAM 132 is, for example, a volatile memory. The ROM 133 is a program memory. The ROM 133 is, for example, a non-volatile memory that is not rewritable.

The data memory 134 stores control data, control programs, setting information, and the like. The data memory 134 is, for example, a non-volatile memory.

The image memory 135 includes a hard disk drive, a page memory, and the like. The image memory 135 stores image data output from the scanner 11 or image data input via the communication interface 17. The image processing unit 136 executes various image processes based on the programs stored in the ROM 133 or the data memory 134.

The clock unit 137 functions as a time information source of the MFP 10. The processor 131 tracks the current date and time based on time information tracked by the clock unit 137.

The operation panel 14 is a user interface. The operation panel 14 includes an input device 141 and a display device 142. The input device 141 is, for example, a button, a keyboard, a keypad, or a touchpad. The display device 142 is, for example, a liquid crystal display, an organic electroluminescence (EL) display, or the like.

The camera 15 is an imaging device built in the MFP 10. The camera 15 operates as a still image imaging device or a moving image imaging device. The camera 15 is an example of an imaging device corresponding to the MFP 10.

The external interface 16 is an interface for connecting an external device. The external interface 16 can be configured as an interface in compliance with a general-purpose standard such as a universal serial bus (USB).

The communication interface 17 performs data communication with other devices connected via the communication network 2 according to a communication protocol.

The data memory 134 stores first information on the MFP 10. The first information on the MFP 10 includes first device identification information and printing-related information. The first device identification information includes, for example, device names, IP addresses, and installation locations. The installation location is a location where the MFP 10 is installed. The printing-related information includes, for example, a printing method, a printing color, a paper size, two-sided or one-sided printing, presence or absence of a finisher, a printing speed, and presence or absence of a security function.

The data memory 134 stores second information provided by the camera 15. The second information is information on the camera 15, and includes second device identification information and imaging-related information. The second device identification information includes, for example, a manufacturer name of the camera 15. The imaging-related information includes a camera function. The camera function includes, for example, functions of person detection, facial recognition, body temperature measurement, 360-degree photography, a certificate, sound recording, video recording, artificial intelligence (AI) mask authentication, a night mode, a cooperative camera, and the like. The certificate function is used, for example, when an image of a picture to be attached to a certificate is captured. The sound recording function is used, for example, when sound is recorded while operating the MFP 10. The video recording function is used, for example, when a video is recorded while operating the MFP 10. The AI mask authentication function is used, for example, when facial recognition is performed in a state where a mask is worn. The night mode function is used, for example, when nighttime crime prevention is monitored. The cooperative camera function is used, for example, when the situation of the camera 15 of another MFP 10 is checked. The device information may be stored in a memory of an external device with which the MFP 10 can communicate, or may be provided in a memory of a server device with which the MFP 10 can communicate via the communication interface 17.

Figure 3:
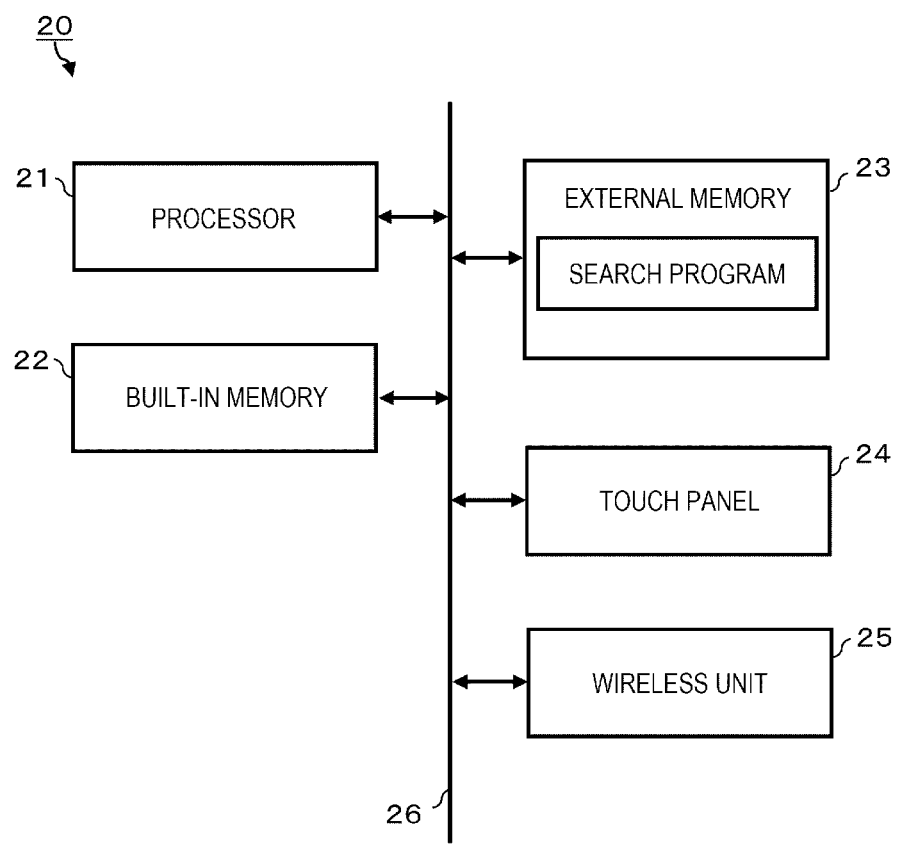
FIG. 3 is a block diagram illustrating a main part circuit configuration of a mobile terminal.

FIG. 3 is a block diagram illustrating a main part circuit configuration of the mobile terminal 20. As illustrated in FIG. 3, the mobile terminal 20 includes a processor 21, a built-in memory 22, an external memory 23, a touch panel 24, a wireless unit 25, and a system transmission path 26. In the mobile terminal 20, the processor 21, the built-in memory 22, the external memory 23, the touch panel 24, and the wireless unit 25 are connected to the system transmission path 26 directly or via a signal input-output circuit. Thus, in the mobile terminal 20, a computer includes the processor 21, the built-in memory 22, the external memory 23, and the system transmission path 26 to which the processor 21, the built-in memory 22, and the external memory 23 are connected.

The processor 21 corresponds to a central part of the above-described computer. The processor 21 controls all units to implement various functions as the mobile terminal 20 according to an operating system or an application program. The processor 21 is, for example, a CPU.

The built-in memory 22 corresponds to a main storage part of the above-described computer. The built-in memory 22 includes a non-volatile memory area and a volatile memory area. The built-in memory 22 stores the operating system or the application program in the non-volatile memory area. The built-in memory 22 stores data necessary for the processor 21 to execute a process for controlling all units in the volatile memory area. The built-in memory 22 uses the volatile memory area as a work area in which data is appropriately rewritten by the processor 21. The non-volatile memory area is, for example, an ROM. The volatile memory area is, for example, an RAM.

The external memory 23 corresponds to an auxiliary storage part of the above-described computer. For example, an SD memory card, a USB memory, or the like may be the external memory 23. The external memory 23 stores data used when the processor 21 executes various processes, data created by the processes in the processor 21, and the like.

The touch panel 24 is a device including both an input device and a display device of the mobile terminal 20. The touch panel 24 is an example of a display unit of the mobile terminal 20.

The wireless unit 25 wirelessly transmits or receives data to or from the access point 40 in accordance with a predetermined wireless communication protocol.

A search application program for using a search service is downloaded to the mobile terminal 20. When printing, scanning, or the like are executed on the MFP 10 by the mobile terminal 20, the search service is a service that enables a search for an MFP 10 that is applicable to the execution. The search application program is hereinafter referred to as a search program. The search program is an example of an information processing program. The search program is stored in the external memory 23. A method of downloading the search program to the external memory 23 is not particularly limited. The search program can be downloaded to the external memory 23 by recording the search program in a removable recording medium or distributing the search program by communication via a network. A form of the recording medium may be in any form as long as the recording medium can store a program and can be read by the device, such as a CD-ROM or a memory card. The search program may be stored in the built-in memory 22.

Figure 4:
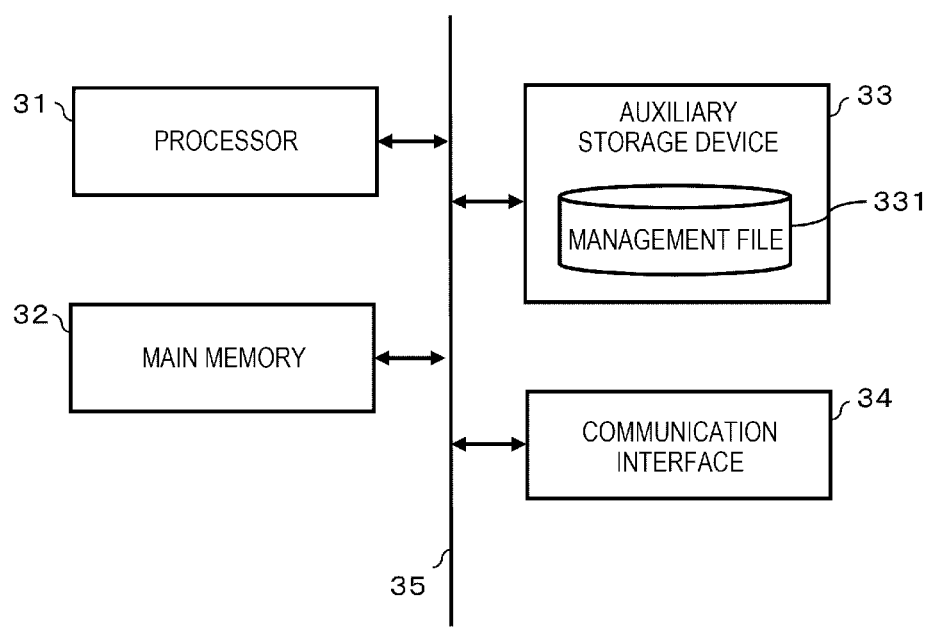
FIG. 4 is a block diagram illustrating a main part circuit configuration of a management server.

FIG. 4 is a block diagram showing a main part circuit configuration of the management server 30. The management server 30 includes a processor 31, a main memory 32, an auxiliary storage device 33, a communication interface 34, and a system transmission path 35. The system transmission path 35 includes an address bus, a data bus, a control signal line, and the like. In the management server 30, the processor 31, the main memory 32, the auxiliary storage device 33, and the communication interface 34 are connected to the system transmission path 35. In the management server 30, a computer includes the processor 31, the main memory 32, the auxiliary storage device 33, and the system transmission path 35 to which the processor 31, the main memory 32, and the auxiliary storage device 33 are connected.

The processor 31 corresponds to a central part of the above-described computer. The processor 31 controls all units to implement various functions as the management server 30 according to an operating system or an application program. The processor 31 is, for example, a CPU.

The main memory 32 corresponds to a main storage part of the above-described computer. The main memory 32 includes a non-volatile memory area and a volatile memory area. The main memory 32 stores the operating system or the application program in the non-volatile memory area. The main memory 32 may store data necessary for the processor 31 to execute a process for controlling all units in the non-volatile or volatile memory area. The main memory 32 uses the volatile memory area as a work area where data is appropriately rewritten by the processor 31. The non-volatile memory area is, for example, an ROM. The volatile memory area is, for example, an RAM.

The auxiliary storage device 33 corresponds to an auxiliary storage part of the above-described computer. For example, an electric erasable programmable read-only memory (EEPROM (registered trademark)), a hard disc drive (HDD), or a solid state drive (SSD) can be used as the auxiliary storage device 33. The auxiliary storage device 33 stores data used when the processor 31 executes various processes, data created by the process in the processor 31, and the like. The auxiliary storage device 33 may store the above-described application program.

The communication interface 34 is connected to the communication network 2. The communication interface 34 performs data communication with other devices connected via the communication network 2 according to a communication protocol.

In the management server 30, a part of a storage area of the auxiliary storage device 33 is set as an area of a management file 331.

FIG. 5 is a schematic diagram illustrating an example of a management data record 3311 stored in the management file 331. As illustrated in FIG. 5, the management data record 3311 includes device information, that is, the first information on the MFP 10 and the second information on the camera 15. The first information on the MFP 10 includes a device name, an IP address, an installation location, and printing-related information. The second information on the camera 15 includes identification information and imaging-related information. The identification information is second device identification information. The management data record 3311 is not limited to data of the above items.

Before starting an operation of the information processing system 1 according to the embodiment, under a condition that the MFP 10 is connected to the communication network 2, the processor 131 of the MFP 10 transmits the device information stored in the data memory 134 to the management server 30 at regular time intervals. Accordingly, the processor 31 recognizes that the MFP 10 is applicable for the search service. The regular time interval is set freely.

When the device information is received, the processor 31 updates the management file 331 based on the device information. Specifically, when there is the management data record 3311 in which the device names included in the device information are recorded, the processor 31 updates the device information included in the management data record 3311 with the received device information. When there is no management data record 3311 in which the device names included in the device information are recorded, the processor 31 adds the management data record 3311 to the management file 331. That is, the management data record 3311 of the MFP 10 applicable for the search service is stored in the management file 331.

Figure 6:
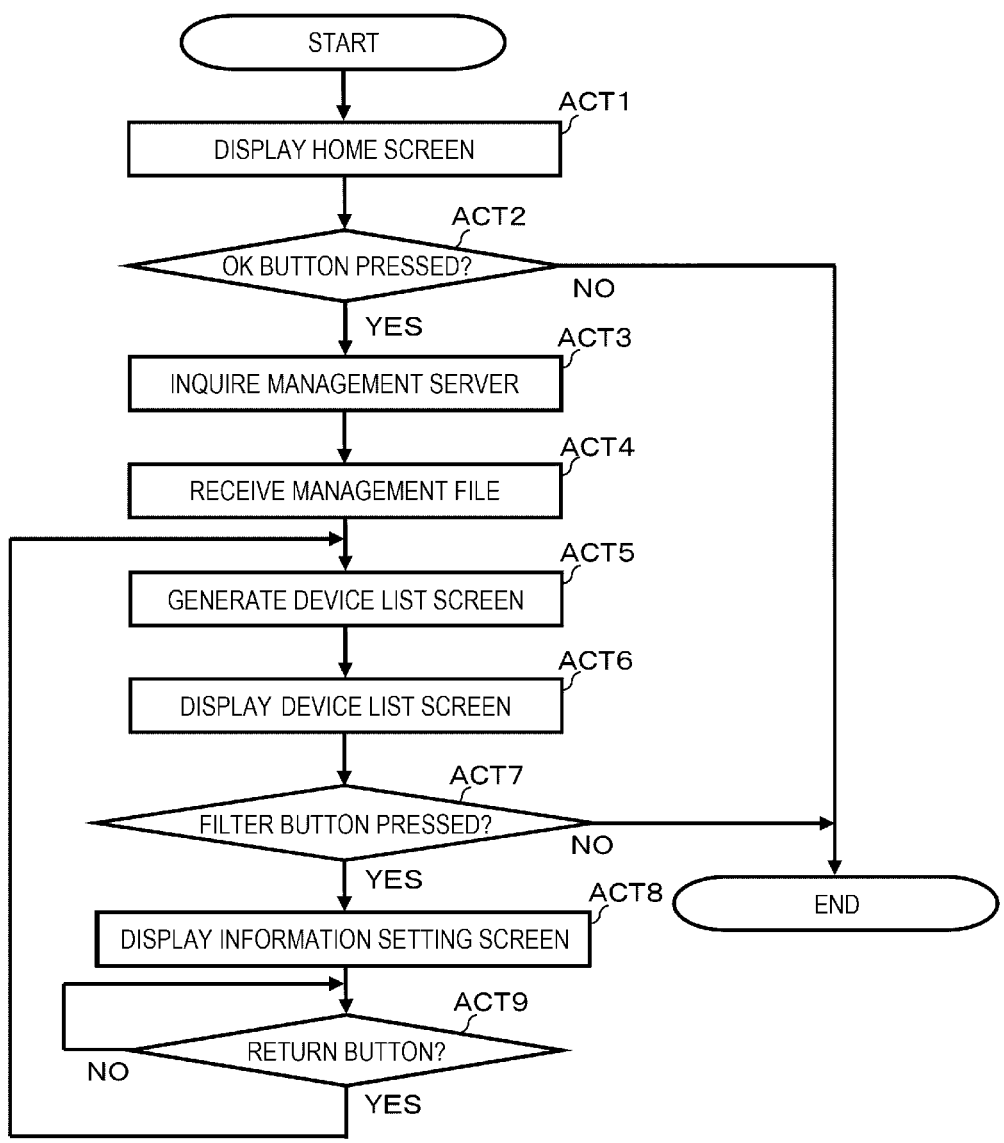
FIG. 6 is a flowchart illustrating a main part control procedure of a processor.

FIG. 6 is a flowchart illustrating a main part control procedure executed by the processor 21 of the mobile terminal 20 according to a search program. Hereinafter, operations of the information processing system 1 will be described with reference to these flowcharts. An operation described below is an example. The procedure thereof is not particularly limited as long as similar results can be achieved.

When the user activates the search program installed in the mobile terminal 20, the processor 21 starts an information processing procedure illustrated in the flowchart in FIG. 6.

In ACT 1, the processor 21 displays a home screen 100 (see FIG. 7) on the touch panel 24.

Figure 7:
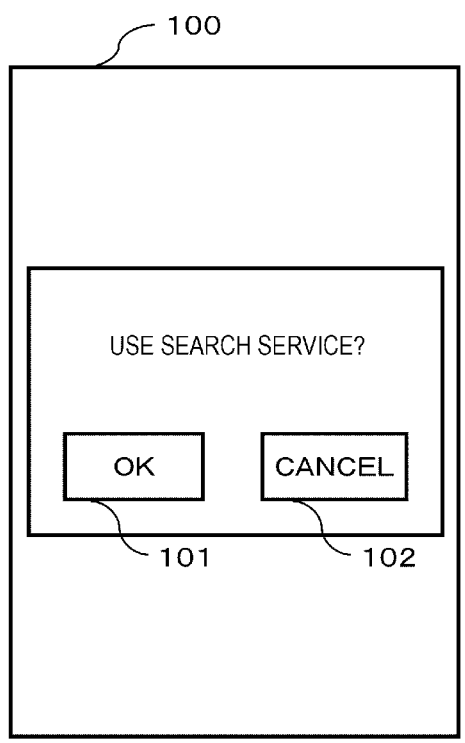
FIG. 7 is a schematic diagram illustrating an example of a home screen.

FIG. 7 is a schematic diagram illustrating an example of the home screen 100. As illustrated in FIG. 7, the home screen 100 includes a message for inquiring the user about the use of the search service, an OK button 101 for instructing the user to use the search service, and a CANCEL button 102 for instructing the user not to use the search service. A content and an image of text data displayed in FIG. 7 are examples.

Referring back to FIG. 6.

In ACT 2, the processor 21 waits for the OK button 101 to be pressed via the touch panel 24 on the home screen 100. When the OK button 101 is not pressed, that is, when the CANCEL button 102 is pressed, the processor 21 determines NO in ACT 2, and ends the information processing procedure illustrated in the flowchart in FIG. 6.

When the OK button 101 is pressed, the processor 21 determines YES in ACT 2, and the process proceeds to ACT 3.

In ACT 3, the processor 21 inquires the management server 30 about the MFP 10 applicable for the search service. In response to this inquiry, the management server 30 transmits the management file 331 to the mobile terminal 20. Then, in ACT 4, the processor 21 receives the management file 331. The external memory 23 stores the management file 331.

In ACT 5, the processor 21 generates a device list screen 200 (see FIG. 8) as the first device list based on the management data record 3311 stored in the management file 331. In ACT 6, the processor 21 displays the device list screen 200 on the touch panel 24.

Figure 8:
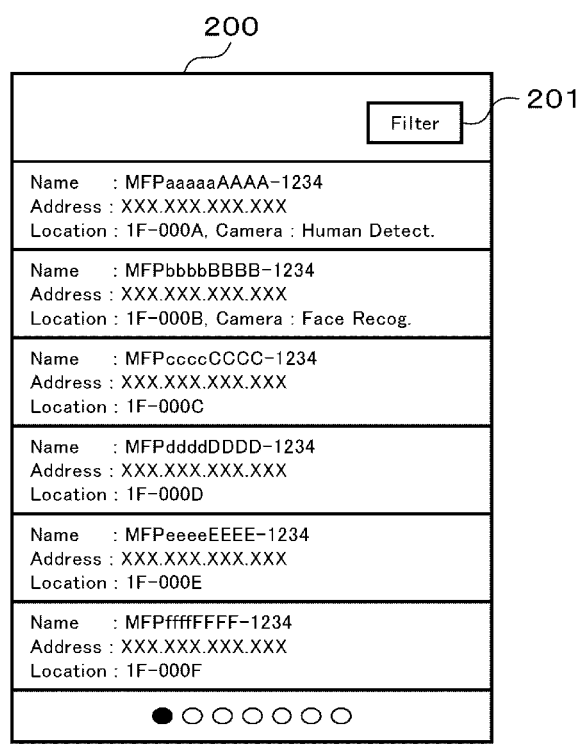
FIG. 8 is a schematic diagram illustrating an example of a device list screen.

FIG. 8 is a schematic diagram illustrating an example of the device list screen 200. The device list screen 200 is a screen in which the device information of MFPs 10 applicable for the search service is displayed in a list format. As illustrated in FIG. 8, the device list screen 200 includes a device list and a filter button 201. The device list is a list in which the device information is displayed line by line. In the case of FIG. 8, the device information includes a device name, an IP address and an installation location as the first information on the MFP 10, and the camera function as the second information on the camera 15. The filter button 201 is a button for calling an information setting screen. The information setting screen will be described in detail later. A content of text data displayed in FIG. 8 is an example.

Referring back to FIG. 6.

In ACT 7, the processor 21 waits for the filter button 201 to be pressed. When the filter button 201 is not pressed, the processor 21 determines NO in ACT 7, and ends the information processing procedure illustrated in the flowchart in FIG. 6.

When the filter button 201 is pressed, the processor 21 determines YES in ACT 7, and the process proceeds to ACT 8.

In ACT 8, the processor 21 displays an information setting screen 300 (see FIG. 9) on the touch panel 24.

Figure 9:
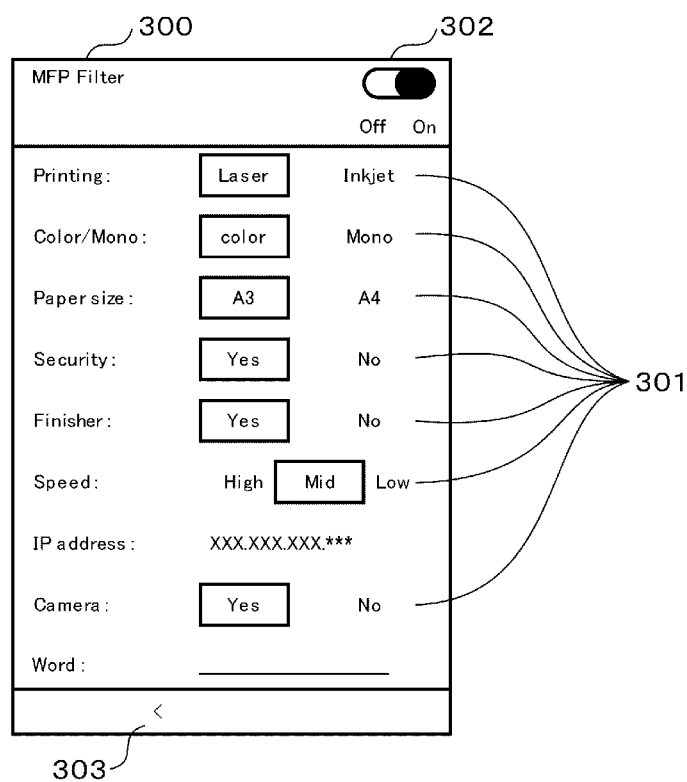
FIG. 9 is a schematic diagram illustrating an example of an information setting screen.

FIG. 9 is a schematic diagram illustrating an example of the information setting screen 300. The information setting screen 300 is a screen for the user to specify a search condition regarding the MFP 10. As illustrated in FIG. 9, the information setting screen 300 includes an item 301 for specifying search conditions, a filter execution button 302, and a return button 303. The item 301 includes, for example, a printing method, a printing color, a paper size, two-sided or one-sided printing, presence or absence of a finisher, a printing speed, presence or absence of a security function, presence or absence of a camera function, and a camera function. That is, the search conditions are search conditions for narrowing down the intended predetermined number of MFPs 10 from the plurality of MFPs 10 applicable for the search service. When the user inputs each search condition of the item 301, each search condition is selected and displayed. The search condition may be selected and displayed to be distinguished from other conditions, for example, by enclosing the search condition in a frame or changing a character color of the search condition. The filter execution button 302 is a button for instructing whether to extract an MFP 10 corresponding to the search condition input by the user. When the extraction is instructed, the user sets the filter execution button 302 to ON. When the extraction is not instructed, the user sets the filter execution button 302 to OFF. The return button 303 is a button for instructing to return to the device list screen 200. A content of text data displayed in FIG. 9 is an example.

When the user inputs a search condition on the information setting screen 300 via the touch panel 24 and sets the filter execution button 302 to ON, the external memory 23 stores the search condition of the information setting screen 300.

Referring back to FIG. 6.

In ACT 9, the processor 21 waits for the return button 303 to be pressed. When the return button 303 is pressed, the processor 21 determines YES in ACT 9, and the process proceeds to ACT 5. That is, the processor 21 generates a device list screen 400 (see FIG. 10) after extraction as the second device list based on the search condition of the information setting screen 300 stored in the external memory 23 and the management data record 3311 stored in the management file 331. The processor 21 displays the device list screen 400 on the touch panel 24. Thus, the processor 21 executes the processes of ACT 5 to ACT 9 in the same manner as described above.

Figure 10:
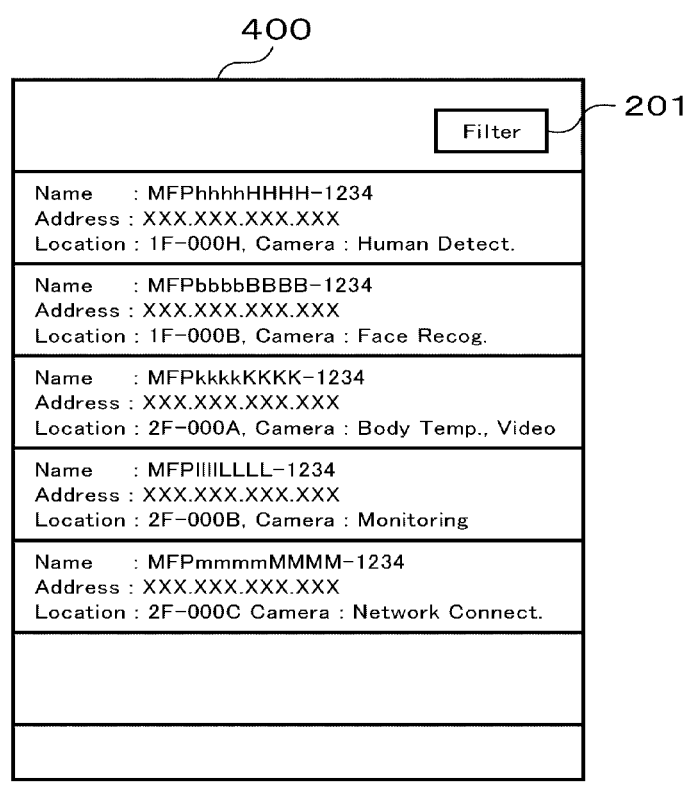
FIG. 10 is a schematic diagram illustrating an example of a device list screen after extraction.

FIG. 10 is a schematic diagram illustrating an example of the device list screen 400 after the extraction. FIG. 10 illustrates the device list screen 400 generated when the user specifies an MFP 10 having the camera function as a search condition on the information setting screen 300 and the processor 21 executes the extraction. On the device list screen 400 after the extraction, the MFPs 10 having the camera function applicable for the search service are displayed. As illustrated in FIG. 10, the device list screen 400, which is an example of the second device list, includes the first information on the MFP 10 in a first display format and the second information on the camera 15 in a second display format. The first information on the MFP 10 in the first display format includes a device name, an IP address, and an installation location of the MFP 10. The second information on the camera 15 in the second display format includes the camera function or the like. For example, the device list screen 400 includes information in the first display format of a first display color such as black and information in the second display format of a second display color such as red. The user can select the MFP 10 by focusing on the information on the camera 15 narrowed down by the search condition via the device list screen 400. A content of text data displayed in FIG. 10 is an example.

As is clear from the above description, the search program as the information processing program causes the computer of the mobile terminal 20 that communicates with one or more MFPs 10 to execute information processes, and the information processes include: acquiring the device information output from the MFP 10 (ACT 4); generating the first device list based on the first information on the MFP 10 and the second information on the camera 15 corresponding to the MFP 10 included in the device information (ACT 5); and outputting the first device list to the touch panel 24 of the mobile terminal 20 (ACT 6).

Therefore, the processor 21 of the mobile terminal 20 generates the device list screen 200 based on the management data record 3311 stored in the management file 331 received from the management server 30, and displays the device list screen 200 on the touch panel 24. The device list screen 200 includes the device information, that is, the first information on the MFP 10 and the second information on the camera 15. Therefore, the MFP 10 having the camera function can be efficiently searched.

The search program causes the computer of the mobile terminal 20 to execute the information processes, and the information processes further include: outputting, to the touch panel 24, information for specifying the search condition regarding the MFP 10 (ACT 8); generating the second device list based on the first information, the second information, and the search condition (ACT 5); and outputting the second device list to the touch panel 24 of the mobile terminal 20 (ACT 6). The search condition includes a condition regarding the camera 15, for example, the presence or absence of the camera 15, and the camera function.

Therefore, the processor 21 displays the information setting screen 300 for specifying the search conditions regarding the MFPs 10 on the touch panel 24. Since the user can specify the MFP 10 having the camera function as a search condition and specify an MFP 10 having a camera for realizing a predetermined function as another search condition, the MFP 10 suitable for the desired condition of the user can be searched. The predetermined function includes camera functions such as person detection, face recognition, body temperature measurement, 360-degree imaging, a certificate, sound recording, video recording, AI mask authentication, a night mode, and a cooperative camera.

Further, the processor 21 generates the device list screen 400 after the extraction based on the search conditions of the information setting screen 300 and the management data record 3311 stored in the management file 331, and displays the device list screen 400 on the touch panel 24. Therefore, the MFP 10 having the camera function suitable for the desired condition of the user can be easily found.

Second Embodiment

Next, a second embodiment will be described with reference to FIGS. 11 to 12.

In the first embodiment, the camera 15 is described to be built in the MFP 10.

Figure 11:
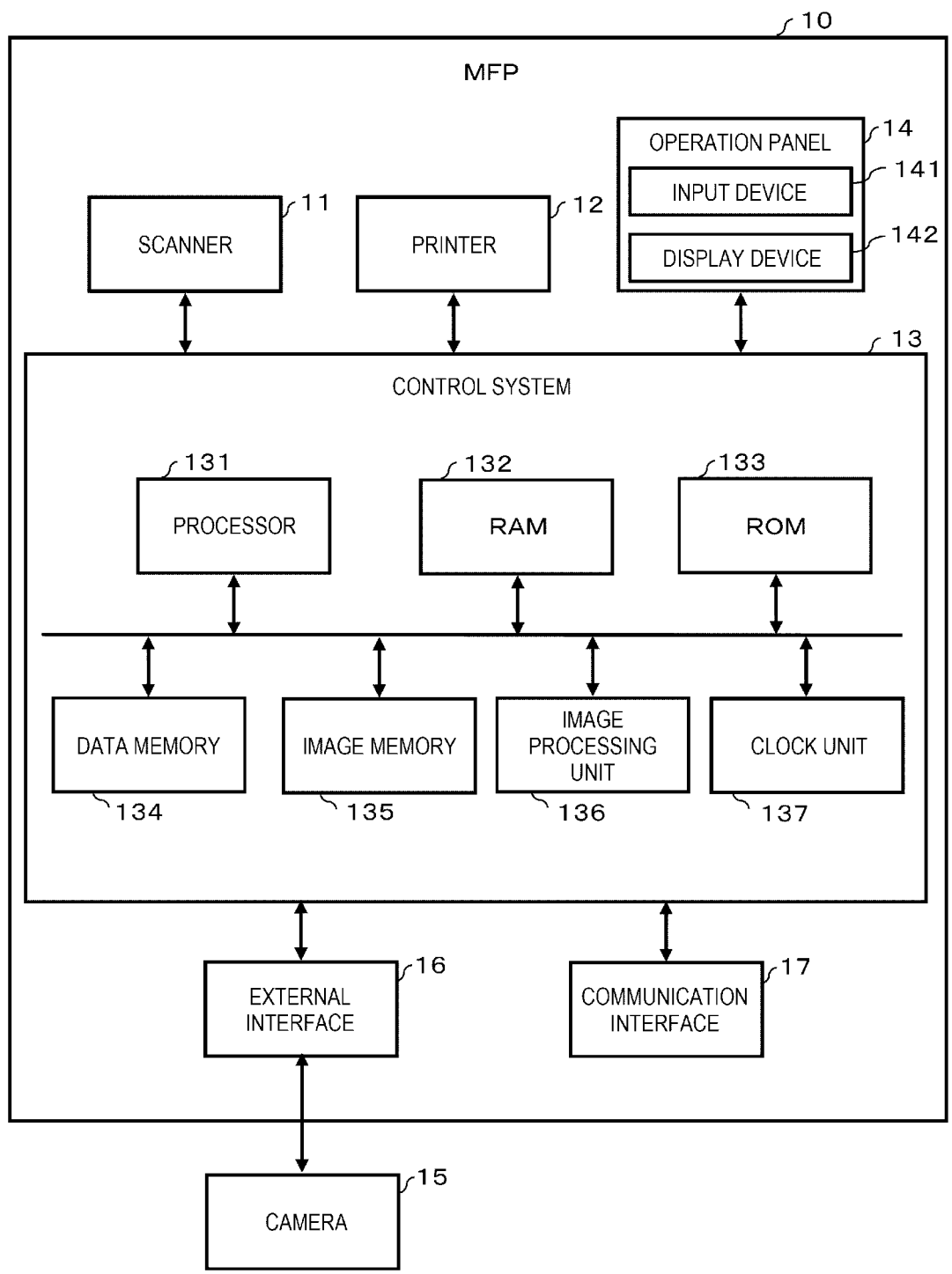
FIG. 11 is a schematic diagram illustrating a schematic configuration of an MFP according to a second embodiment.

In the second embodiment, as illustrated in FIG. 11, in the MFP 10, the camera 15 is connected to the external interface 16. That is, the second embodiment is different from the first embodiment in that the camera 15 is not built in the MFP 10. In the drawings and the following description according to the second embodiment, the same elements as those in the first embodiment are denoted by the same reference numerals. Therefore, description of the same elements may be omitted. Incidentally, FIGS. 1, 3 to 10 used in the description of the first embodiment are common to the second embodiment, and thus the description thereof will be omitted here.

FIG. 11 is a schematic diagram illustrating a schematic configuration of the MFP 10 according to the second embodiment. As illustrated in FIG. 11, the external interface 16 is connected with the camera 15 and acquires the second information provided by the camera 15. As the camera 15, a general-purpose camera can be used.

The data memory 134 stores the first information on the MFP 10. The first information on the MFP 10 includes the first device identification information and the printing-related information. The data memory 134 stores second information provided by the external interface 16. The second information is information on the camera 15, and includes the second device identification information and the imaging-related information. The first information on the MFP 10 and the second information on the camera 15 may be stored in a memory of an external device with which the MFP 10 can communicate, or may be provided in a memory of a server device with which the MFP 10 can communicate via the communication interface 17.

Figure 12:
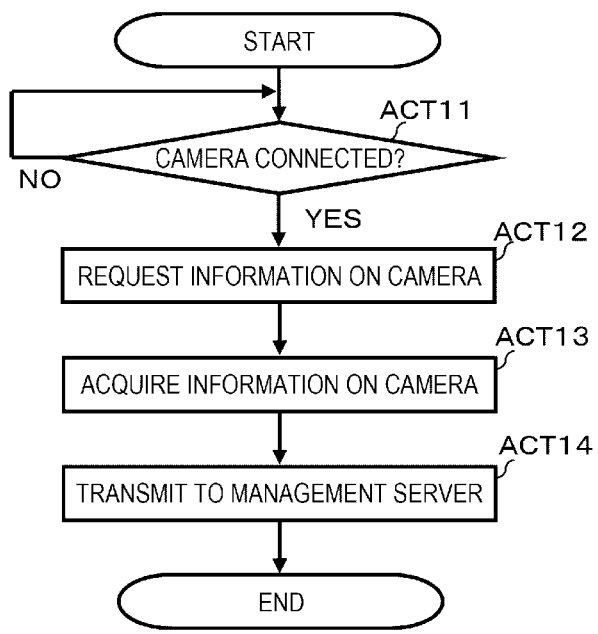
FIG. 12 is a flowchart illustrating a main part control procedure of a processor.

FIG. 12 is a flowchart illustrating a main part control procedure executed by the processor 131 of the MFP 10 according to a search program in the second embodiment. A content of an operation described below is an example. The operation procedure and the content thereof are not particularly limited as long as similar results can be obtained.

When the camera 15 is connected to the MFP 10 and the power of the camera 15 is turned on, the processor 131 of the MFP 10 starts an information processing procedure illustrated in the flowchart in FIG. 12. That is, in ACT 11, the processor 131 waits for the camera 15 to be connected.

When the camera 15 is connected, the processor 131 determines YES in ACT 11, and the process proceeds to ACT 12.

In ACT 12, the processor 131 outputs an on signal for requesting the camera 15 for the second information on the camera 15 via the external interface 16. In response to the on signal, the camera 15 outputs the second information on the camera 15 to the MFP 10. The external interface 16 receives the second information on the camera 15 provided from the camera 15.

In ACT 13, the processor 131 acquires the second information on the camera 15. The data memory 134 stores the acquired second information on the camera 15.

In ACT 14, under the condition that the MFP 10 is connected to the communication network 2, the processor 131 generates the device information based on the first information on the MFP 10 stored in the data memory 134 and the second information on the camera 15 received by the external interface 16 and transmits the device information to the management server 30, at regular time intervals. For example, the processor 131 generates the device information based on the first device identification information and the printing-related information included in the first information, and the second device identification information and the imaging-related information included in the second information. Accordingly, the management server 30 recognizes that the MFP 10 is applicable for the search service. The regular time interval is set freely. As described above, the processor 131 ends the information processing procedure illustrated in the flowchart in FIG. 12.

When the device information is received, the processor 131 of the management server 30 updates the management file 331 based on the device information. Specifically, when there is the management data record 3311 in which the device names included in the device information are recorded, the processor 131 updates the device information included in the management data record 3311 with the received device information. When there is no management data record 3311 in which the device names included in the device information are recorded, the processor 131 adds the management data record 3311 to the management file 331. That is, the management data record 3311 of the MFP 10 applicable for the search service is stored in the management file 331.

As described above, according to the second embodiment, when the camera 15 is connected to the MFP 10 via the external interface 16, the processor 131 acquires the second information on the camera 15 output from the camera 15. The processor 131 transmits the first information on the MFP 10 and the second information on the camera 15, that is, the device information to the management server 30. Therefore, even when the general-purpose camera 15 is connected to the MFP 10, the MFP 10 having a camera function can be efficiently searched, as in the case where the camera 15 is built in the MFP 10.

As described above, the embodiments of the information processing program and the information communication device are described above, but are not limited thereto.

In the above embodiments, the MFP 10 is exemplified as an example of the information processing device. The information processing device may be, for example, a copier, a printer, or the like.

In the above embodiment, the search condition of the information setting screen 300 is exemplified to include the presence or absence of the camera function. For example, the search condition may include the presence or absence of a more detailed camera function. For example, the presence or absence of human detection, the presence or absence of facial recognition, and the like.

In the above embodiments, the management server 30 is exemplified to provide the device information to each mobile terminal 20, but the MFP 10 may play the role of the management server 30. For example, the processor 131 of the MFP 10 generates the device information based on the first information on the MFP 10 stored in the data memory 134 and the second information on the camera 15 provided by the camera 15. For example, the processor 131 generates the device information based on the first device identification information and the printing-related information included in the first information, and the second device identification information and the imaging-related information included in the second information. The first information is the first device information on the MFP 10, and the second information is the second device information on the camera 15. That is, the processor 131 generates third device information based on the first device information and the second device information. The communication interface 17 outputs the third device information like the device information of the MFP 10 in response to a request for the device information from the mobile terminal 20. In this case, an existing technique such as a zero-configuration technique can be used. For example, when the OK button 101 is pressed via the touch panel 24 on the home screen 100, each of the processors 131 of one or more MFPs 10 applicable for the search service directly transmits the third device information to the mobile terminal 20. The external memory 23 stores the third device information from each MFP 10. The external memory 23 may store the management file 331. When the external memory 23 stores the management file 331, the processor 21 updates the management file 331 based on the received third device information. The processor 21 may generate the device list screen 200 based on the management data record 3311 stored in the management file 331.

In the first embodiment, the camera 15 is exemplified to be built in the MFP 10. In the second embodiment, the camera 15 is exemplified to be connected to the external interface 16 of the MFP 10. The camera 15 may be connected to the MFP 10 by wireless communication. In this case, for example, one or more cameras 15 may be installed at positions where images of the MFP 10 and the user who operates the MFP 10 can be captured.

An entity that executes the operations in the present embodiment is, for example, an entity related to a computer, such as hardware, a complex of hardware and software, software, and software being executed. Examples of the entity that executes the operations include, but are not limited to, a process executed on a processor, an object, an execution file, a thread, and a program. For example, the information communication device or an application executed in the information communication device may be the entity that executes the operations. A process or a thread may be caused to run a plurality of entities that execute the operations. The entities that execute the operations may be in one information communication device, or may be distributed to a plurality of information communication devices.

The functions described above may be recorded in advance in the device, similar functions may be downloaded from the network to the device, or similar functions stored in a recording medium may be installed in the device. The recording medium may be in any form such as a disk ROM or a memory card as long as the recording medium is a non-temporary recording medium that can store a program and can be read by the device. Further, the functions obtained by installation or downloading in advance as described above may be realized in cooperation with an operating system (OS) or the like in the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A method executed by a computer of an information communication device that communicates with one or more information processing devices, the method comprising:
   acquiring device information output from the one or more information processing devices comprising an integrated camera;
   generating a first device list based on first information on the one or more information processing devices and second information regarding the integrated camera respectively integrated into each of the one of the one or more information processing devices, included in the device information; and
   outputting the first device list to a display of the information communication device.

2. The method according to claim 1, further comprising:
   by the computer,
   outputting, to the display of the information communication device, information for specifying a search condition regarding the one or more information processing devices;
   generating a second device list based on the first information, the integrated camera information, and the search condition; and
   outputting the second device list to the display of the information communication device.

3. The method according to claim 2, wherein the search condition comprises a condition associated with the integrated camera.

4. The method according to claim 3, wherein the second device list comprises information on the one or more information processing devices in a first display format and information on the integrated camera in a second display format.

5. The method according to claim 1, wherein the information communication device communicates with one or more information processing devices in a wireless manner.

6. The method according to claim 1, wherein second information regarding the integrated camera respectively integrated into each of the one of the one or more information processing devices comprises at least one of person detection, facial recognition, body temperature measurement, 360-degree photography, a certificate, sound recording, video recording, artificial intelligence mask authentication, a night mode, or a cooperative camera.

7. An information processing device, comprising:
a memory configured to store first information including first device identification information and printing-related information for the first device having an integrated camera;
a processor configured to:
acquire information regarding the integrated camera, wherein the integrated camera information includes identification information and at least one feature of the integrated camera, and
generate device information based on the first device identification information and the printing-related information included in the first information and the integrated camera information; and
a communication interface configured to output the device information.

8. The information processing device according to claim 7, the processor is further configured to:
output, to a display of the information communication device, information for specifying a search condition regarding one or more information processing devices;
generate a second device list based on the first information, the integrated camera information, and the search condition; and
output the second device list to the display.

9. The information processing device according to claim 8, wherein the search condition comprises a condition associated with the integrated camera.

10. The information processing device according to claim 9, wherein the second device list comprises information on one or more information processing devices in a first display format and information on the integrated camera in a second display format.

11. The information processing device according to claim 7, wherein the information communication device communicates with one or more information processing devices in a wireless manner.

12. The information processing device according to claim 7, wherein the at least one feature of the integrated camera comprises at least one of person detection, facial recognition, body temperature measurement, 360-degree photography, a certificate, sound recording, video recording, artificial intelligence mask authentication, a night mode, or a cooperative camera.

13. The information processing device according to claim 7, wherein the information processing device is an electrophotographic printer, an inkjet printer, or a thermal transfer printer.

14. A method executed by a mobile device that communicates with one or more printers, the method comprising:
acquiring device information output from the one or more printers wherein the one or more printers respectively include an integrated camera;
generating a first device list based on first information on the one or more printers and second information regarding the integrated camera respectively integrated into each of the one of the one or more printers, included in the device information; and
outputting the first device list to a display of the mobile device.

15. The method according to claim 14, further comprising:
by the computer,
outputting, to the display of the mobile device, information for specifying a search condition regarding the one or more printers;
generating a second device list based on the first information, the integrated camera information, and the search condition; and
outputting the second device list to the display of the mobile device.

16. The method according to claim 15, wherein the search condition comprises a condition associated with the integrated camera.

17. The method according to claim 16, wherein the second device list comprises information on the one or more printers in a first display format and information on the integrated camera in a second display format.

18. The method according to claim 14, wherein the mobile device communicates with one or more printers in a wireless manner.

19. The method according to claim 14, wherein the mobile device is a smartphone or tablet.

20. The method according to claim 14, wherein the second information regarding the integrated camera respectively integrated into each of the one of the one or more printers comprises at least one of person detection, facial recognition, body temperature measurement, 360-degree photography, a certificate, sound recording, video recording, artificial intelligence mask authentication, a night mode, or a cooperative camera.

* * * * *